United States Patent
Iezzi et al.

(10) Patent No.: US 11,634,534 B2
(45) Date of Patent: Apr. 25, 2023

(54) DEGRADABLE SILYL-CONTAINING THERMOSETTING NETWORKS

(71) Applicant: The Government of the United States of America, as represented by the Secretary of the Navy, Arlington, VA (US)

(72) Inventors: Erick B. Iezzi, Mars, PA (US); Eugene Camerino, Dumfries, VA (US); Grant Daniels, Lorton, VA (US); James H. Wynne, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 305 days.

(21) Appl. No.: 16/917,179

(22) Filed: Jun. 30, 2020

(65) Prior Publication Data

US 2020/0332054 A1    Oct. 22, 2020

Related U.S. Application Data

(63) Continuation-in-part of application No. 15/843,181, filed on Dec. 15, 2017, now Pat. No. 10,730,993.

(60) Provisional application No. 62/434,628, filed on Dec. 15, 2016.

(51) Int. Cl.
| | |
|---|---|
| *C08G 18/10* | (2006.01) |
| *C08G 18/82* | (2006.01) |
| *C08G 18/38* | (2006.01) |
| *C08G 18/72* | (2006.01) |
| C08G 77/00 | (2006.01) |
| C08G 77/60 | (2006.01) |
| C08G 77/62 | (2006.01) |
| C08G 59/14 | (2006.01) |

(52) U.S. Cl.
CPC ............ *C08G 18/82* (2013.01); *C08G 18/10* (2013.01); *C08G 18/3897* (2013.01); *C08G 18/72* (2013.01); C08G 59/14 (2013.01); C08G 77/00 (2013.01); C08G 77/60 (2013.01); C08G 77/62 (2013.01)

(58) Field of Classification Search
CPC .... C08G 18/82; C08G 18/3893; C08G 18/10; C08G 18/72; C08G 59/00; C08G 59/14; C08G 77/60; C08G 77/62; C08G 77/00
See application file for complete search history.

(56) References Cited

U.S. PATENT DOCUMENTS

| | | | | |
|---|---|---|---|---|
| 2,527,590 | A * | 10/1950 | Speier, Jr. ........ | C08G 18/3893 556/454 |
| 2,843,560 | A * | 7/1958 | Mika ................ | C08G 59/62 523/435 |
| 10,730,993 | B2 * | 8/2020 | Iezzi ................ | C08G 18/73 |
| 11,401,368 | B2 * | 8/2022 | Iezzi ................ | C08J 11/20 |
| 2002/0131951 | A1 * | 9/2002 | Langer ............ | A61K 47/593 424/78.37 |
| 2003/0181712 | A1 * | 9/2003 | Nelson ............ | C07H 21/00 536/25.31 |
| 2011/0163482 | A1 * | 7/2011 | Ro .................. | C08G 18/4825 264/496 |

OTHER PUBLICATIONS

Search Report in EP18760849.2 (dated Dec. 18, 2020).

* cited by examiner

*Primary Examiner* — Margaret G Moore
(74) *Attorney, Agent, or Firm* — US Naval Research Laboratory; Joseph Grunkemeyer

(57) ABSTRACT

A process of: providing a polyfunctional compound selected from polyisocyanate, polyacrylate, and polyepoxy; and reacting the polyfunctional compound with a hydroxyl- or amine-terminated silyl-containing compound. The polyfunctional compound and the silyl-containing compound are at least difunctional. A thermoset made by this process.

15 Claims, 5 Drawing Sheets

DEGRADABLE SILYL-CONTAINING THERMOSETTING NETWORKS

This application is a continuation-in-part application of U.S. Pat. No. 10,730,993, issued on Aug. 4, 2020, which claims the benefit of U.S. Provisional Application No. 62/434,628, filed on Dec. 15, 2016. The provisional application and all other publications and patent documents referred to throughout this nonprovisional application are incorporated herein by reference.

TECHNICAL FIELD

The present disclosure is generally related to silyl-containing thermosets.

DESCRIPTION OF RELATED ART

Thermosetting materials, commonly referred to as thermosets, are formed from the chemical reaction of two or more synthetic materials to generate a permanent three-dimensional network. Unlike thermoplastic materials, thermosets cannot be melted and reflowed into another form, which makes them useful for applications where thermal, chemical and/or UV-oxidative resistance are required. However, the cross-linked network of thermosets makes them difficult to degrade and destroy. Thermosets offer unique attributes and functional properties, which enables their utilization in numerous military and commercial applications. For example, thermosets are used to provide high-performance topcoats and primers for ships, aircraft and ground vehicles, adhesives for aircraft canopies, high-strength composites for ship hulls and the fuselage of aircraft, and high-temperature composites for aircraft exhausts.

Thermosets are currently degraded by using harsh chemicals, incineration, or physical methods. For instance, Navy aircraft topcoats and primers are often removed with methylene chloride, which solvates and swells the polymeric chains of the coatings so they can be easily removed via scraping or brushing. However, methylene chloride is highly toxic and carcinogenic to humans, and less toxic alternatives, such as peroxides and benzyl alcohols, have proven to be less effective at coating removal. Abrasive blasting is utilized to physically remove coatings, yet these methods present a health hazard due to the generation of microscopic particles. As a result, containment with sufficient ventilation, in addition to respirators, must be utilized by workers to reduce health risks.

Thermosets with bonds that can be selectively cleaved have been recently developed to enable these materials to be more easily degraded and destroyed. Examples include epoxies that contain alkene linkages, which were cleaved using harsh oxidizing reagents, such as permanganates, and epoxies that contain ester linkages, which were cleaved with strong acids or bases. However, in all cases, these reagents were slow to cleave the selective bonds in epoxy thermosets unless a large excess of reagent and heat were applied. Furthermore, bond cleavage within these epoxy thermosets was stoichiometric, meaning that only one bond was cleaved per chemical reagent, thus not sufficiently degrading the cross-linked system until a substantial number of bonds were broken. Conversely, thermoset components designed with an excess of selective cleavable groups may lack sufficient properties for many of the aforementioned applications, even though they are easy to degrade. To date, these limitations have prevented the development of durable, thermally stable, and rigid thermosets that can also be easily degraded and destroyed on-demand with mild and benign chemicals.

BRIEF SUMMARY

Disclosed herein are a process and a thermoset made thereby comprising: providing a polyfunctional compound selected from polyisocyanate, polyacrylate, and polyepoxy; and reacting the polyfunctional compound with a hydroxyl- or amine-terminated silyl-containing compound. The polyfunctional compound and the silyl-containing compound are at least difunctional.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted to not obscure the present disclosure with unnecessary detail.

Figure 1:
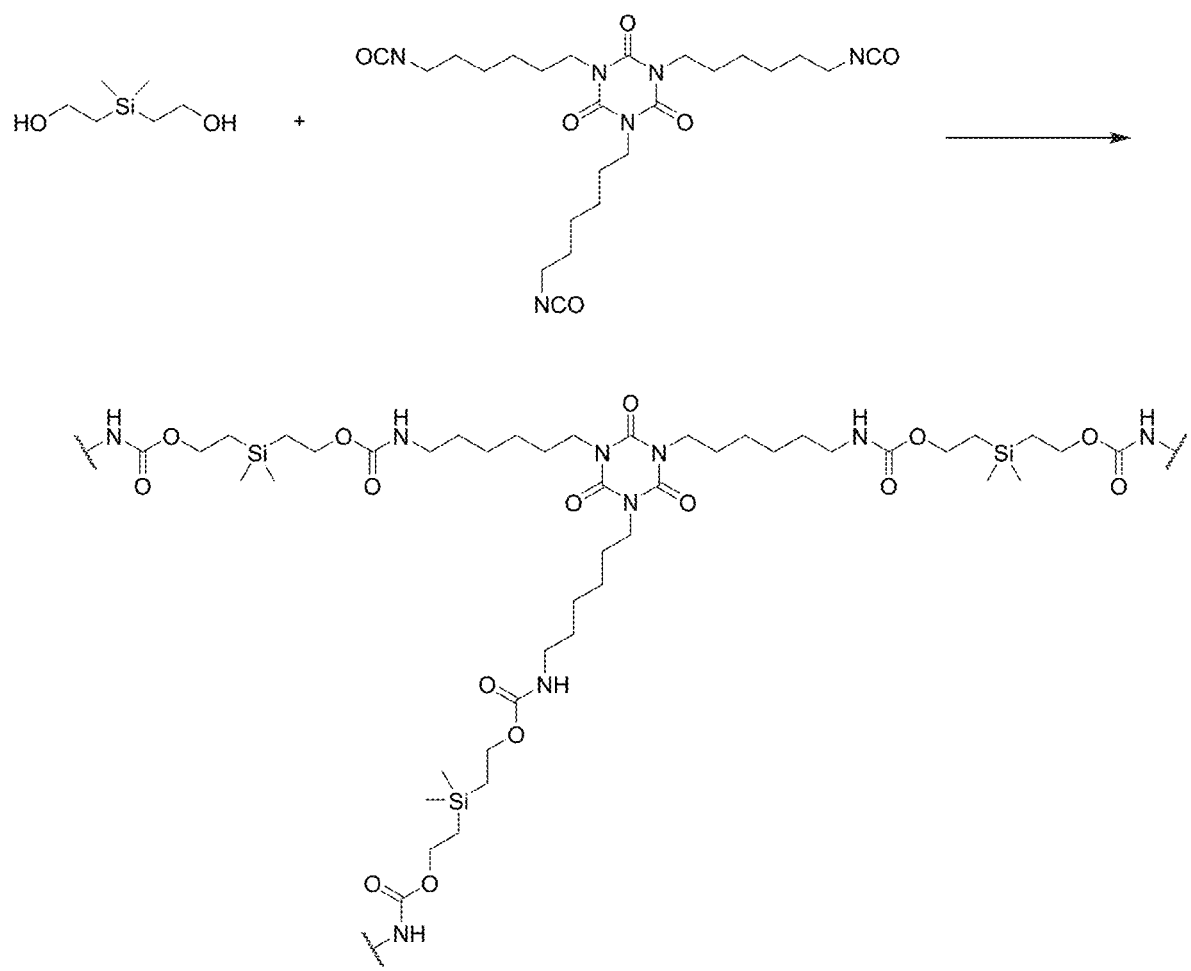
FIG. 1 shows an example of a thermoset formed from a silyl-containing hydroxyl-functional molecule and a tri-functional aliphatic isocyanate.

Described herein are hydroxyl and amine-terminated silyl-containing molecules for forming thermosets that can disassemble on-demand when treated with specific chemical reagents. The technology is based on hydroxyl- and amine-functional molecules that contain silyl groups and aliphatic linkages. The silyl group is defined as the "trigger". These molecules can be reacted with a cross-linker molecule, such as an aliphatic polyisocyanate, to form a stable thermoset film with tailored mechanical properties. FIG. 1 shows an example of a polyurethane thermoset formed from a silyl-containing hydroxyl-functional molecule and a tri-functional aliphatic isocyanate.

Figure 2:
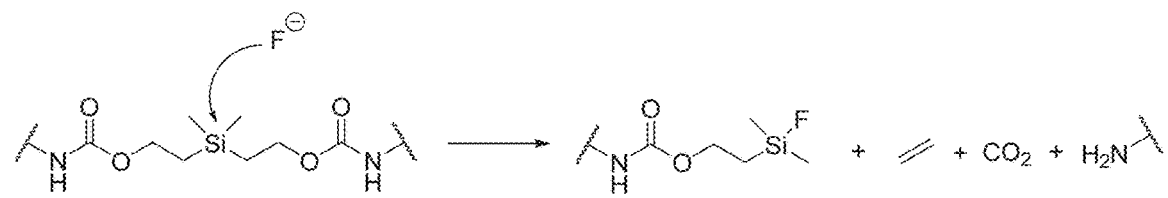
FIG. 2 shows an example of cascading bond cleavage and release of volatile molecules within a polyurethane thermoset that has been treated with a fluoride salt stimulus.

Unlike traditional thermosets, these materials can be degraded into smaller molecules by treating with a specific chemical "stimulus", such as mild and relatively benign fluoride salts. Addition of the stimulus results in activation of the trigger via cleavage of the silicon-carbon bond, followed by subsequent cascading bond degradation and release of smaller molecules as the chains within the thermoset disassemble. Ethylene and carbon dioxide, which are volatile molecules, are released during disassembly. FIG. 2 shows an example of bond cleavage within a polyurethane thermoset that has been treated with a fluoride salt stimulus.

Potential applications for these disassembling thermosets include: 1) rapid removal of aircraft coatings without utilizing toxic chemicals, such as methylene chloride, 2) selective removal of a topcoat from an underlying organic composite without affecting the composite, 3) self-destructing electronics, 4) recyclable materials, and 5) rapid removal of bandage adhesives.

Figure 3:
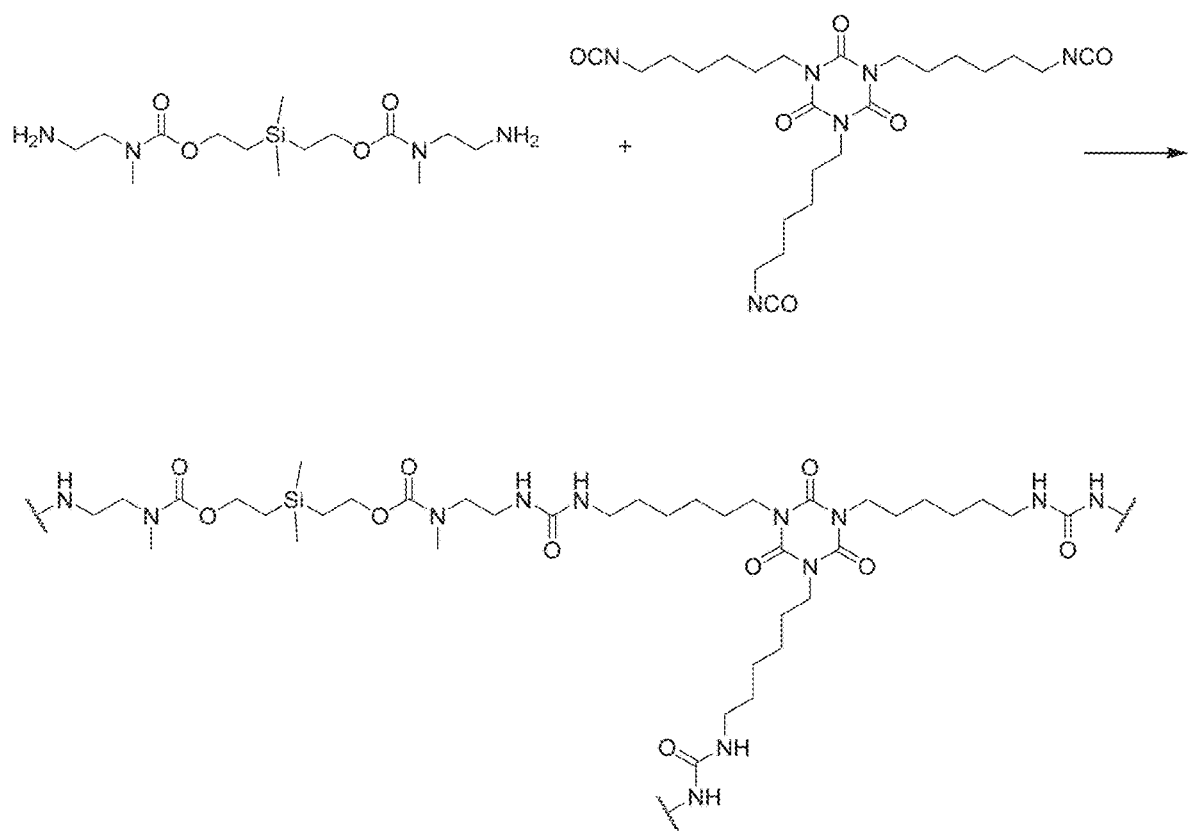
FIG. 3 shows an example of a thermoset formed from a silyl-containing amine-functional molecule and a tri-functional aliphatic isocyanate.
Figure 4:
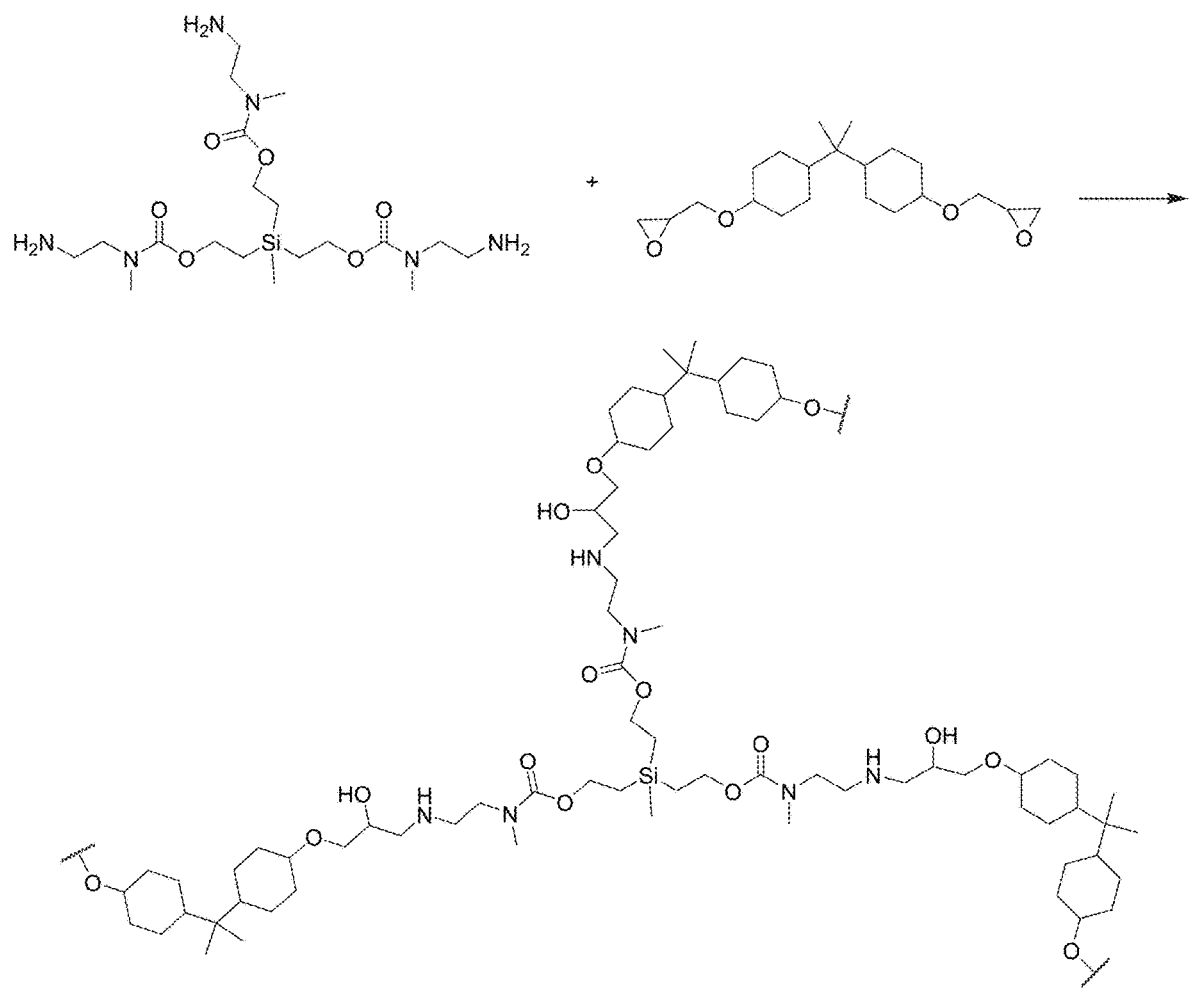
FIG. 4 shows an example of a thermoset formed from a silyl-containing amine-functional molecule and a di-functional epoxy.

The disclosed thermosets may be made by reacting a polyfunctional compound with a silyl-containing compound that possesses organic functional groups. Both compounds are at least difunctional. As used herein, the term "thermoset" includes linear polymers made solely from difunctional compounds. Cross-linked thermosets may be made when either or both of the compounds are at least trifunctional, as shown in FIGS. 1, 3, and 4. The polyfunctional compound is a polyisocyanate, a polyacrylic, or a polyepoxy. The silyl-containing compound has hydroxyl and/or amino groups. The possible reactions between these functional groups are shown below.

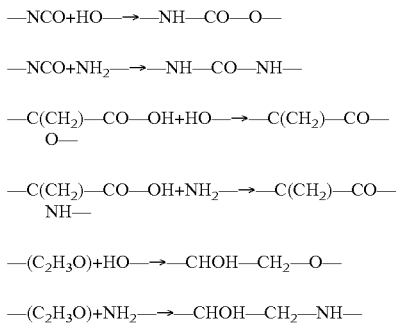

When a polyisocyanate is used, it may be aliphatic, aromatic, cycloaliphatic an isocyanate homopolymer, or an isocyanate-functional pre-polymer. One suitable polyisocyanate is an aliphatic trimer based on hexamethylene diisocyanate (FIG. 1). Other examples include, but are not limited to, toluene diisocyanate, methylene diphenyl diisocyanate, isophorone diisocyanate, isocyanate homopolymers, isocyanate-functional urethanes, isocyanate-functional polyesters, isocyanate-functional polyethers, isocyanate-functional polysiloxanes, and mixtures thereof. Acrylate- and epoxy-functional molecules can also be used to form a cross-linked thermoset. Suitable epoxy- or acrylate-functional compounds include, but are not limited to, epoxy-functional dimethylpolysiloxanes, epoxy-functional polydimethyldiphenylsiloxanes, aliphatic epoxies, aromatic epoxies, cycloaliphatic epoxies, acrylate-functional dimethylpolysiloxanes, and 1,6-hexanedioldiacrylate.

Combinations or more than one polyisocyanate, polyacrylic, and/or polyepoxy may be used.

One general formula for the silyl-containing compound is shown below. X and X' are derived from hydroxyl or amino groups. When m is 0, the compound is a small molecule, and may be made by addition of hydroxyl or amino to a vinyl group by methods known in the art. Chain extension, as described below, may be used to make the compound larger, resulting in a positive value for m. Combinations of more than one hydroxyl and/or amino compounds may be used, so that each X may be either —O— or —NR$_2$— and each X' may be either —OH or —NHR$^2$. The value of n is 0, 1, or 2, such that there are at least two terminal hydroxyl and/or amino groups. Each R$^1$ group is an alkyl or aryl group, each R$^2$ group is —H or an alkyl or aryl group, and each R$^3$ group is an alkylene group. More specifically, the silyl compound may have the formula $SiR^1{}_n[(CH_2)_2OH]_{4-n}$.

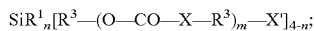

Suitable silyl compounds include, but are not limited to, $Si(CH_3)_2(CH_2CH_2OH)_2$, $Si(Ph)_2(CH_2CH_2OH)_2$, $SiPh(CH_2CH_2OH)_3$, $Si(CH_2CH_2OH)_4$, $Si(Ph)_2(CH_2CH_2OCON(CH_3)CH_2CH_2OH)_2$, wherein Ph is a phenyl group. When the R$^3$ group is present, suitable alkylenes include, but are not limited to, ethylene, propylene, and butylene.

Figure 5:
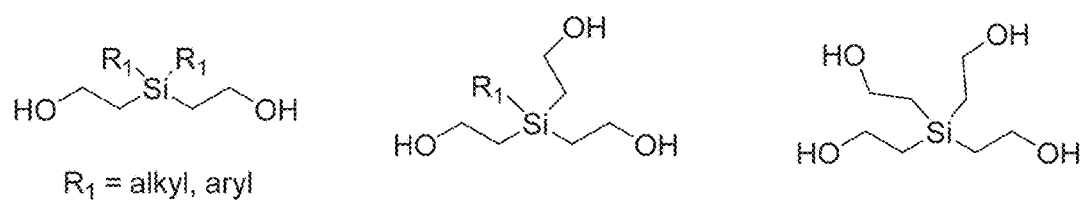
FIG. 5 shows silyl-centered diols, triols, and tetraols for forming thermosets that can disassemble.
Figure 6:
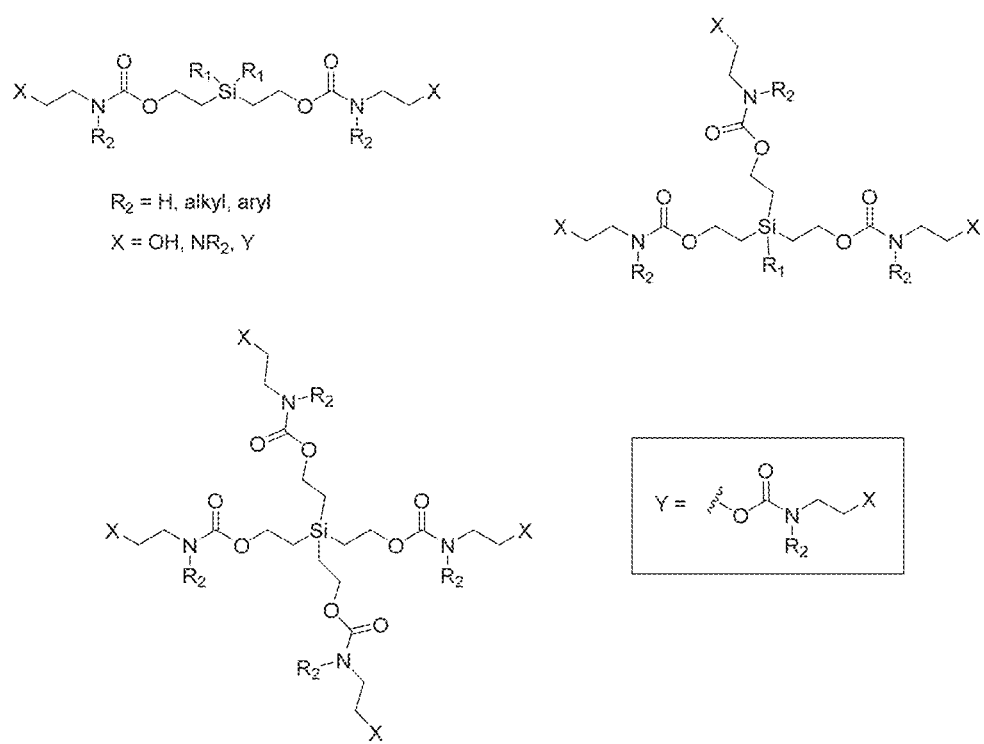
FIG. 6 shows silyl-centered extended chain carbamates with hydroxyl and amine functionality.
Figure 7:
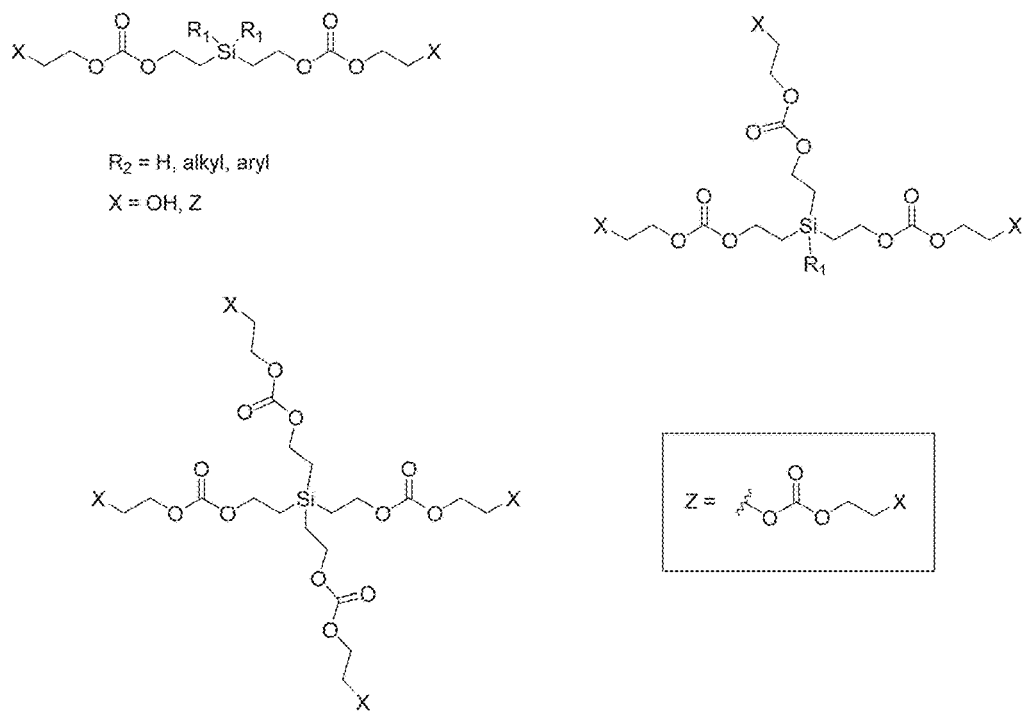
FIG. 7 shows silyl-centered extended chain carbonates with hydroxyl and amine functionality.

The silyl-containing hydroxyl and amine-functional molecules can possess a variety of compositions, sizes, and functionalities. For example, the silyl group can contain dimethyl, diphenyl, or other combinations of alkyl and aryl groups, whereas simple molecules can possess di-, tri- and tetra-hydroxyl functionality as shown in FIG. 5. These molecules can also be used to synthesize chain-extended molecules that contain either carbamate and/or carbonate groups and terminal hydroxyl or amine groups. FIG. 6 shows examples of the extended chain carbamate-containing structures that can be synthesized based on the molecules in FIG. 5, whereas FIG. 7 shows examples of the extended chain carbonate-containing structures that can be synthesized based on the molecules in FIG. 5. Extended-chain molecules can also possess both carbamate and carbonate linkages. The purpose of utilizing the extended chains is to provide for greater disassembly within a thermoset, as the longer chains can disassemble into ethylene, carbon dioxide, and cyclic structures, such and oxazolidinones and dioxolanones. Greater bond fragmentation has shown to provide for faster thermoset disassembly when treated with the same amount of a stimulus as those thermosets formed using molecules in FIG. 5.

In addition to the structures shown in FIGS. 3-5, the silyl-containing molecules can possess hydrocarbon chains with lengths ranging from one to many methylene linkages. The purpose of using different hydrocarbon chains is to enable tailored attributes, such as mechanical properties, viscosity, solubility, and rates of chain disassembly. The silyl-containing molecules can also possess hydrocarbon chains with branched structures, polyether linkages, polyester linkages, or polysulfide linkages, all to provide for tailored mechanical properties, viscosity, or solubility.

The two compounds may be reacted to form the thermoset according to methods known in the art. The reactions may generally proceed spontaneously, however a catalyst may be used. A solvent, pigment, or additive is also optional. Another optional component is a reactive diluent. The diluent need not contain a silyl group, but does have at least one hydroxyl or amine group. Thus, the diluent may be monofunctional.

The amount of the silyl-containing compound used in the reaction may be at least 5 wt. % of the total amount of the hydroxyl- or amine-terminated compound and the polyfunctional compound. As used herein, this is equivalent to stating that the thermoset comprises at least 5 wt. % of the silyl-containing compound.

The thermoset may be formed by applying the two compounds to a substrate via spray, brush, roll, print or dip method before the thermoset is formed. The compounds may be applied as mixture or as separate applications, which may be simultaneous. Some reaction of the compounds may have occurred, as long as a cross-linked thermoset is not formed until the materials have been applied to the surface.

The thermoset can be disassembled by reaction with a fluoride salt, an acid, or a base to cleave the silicon-carbon bonds. Any degree of cleavage may be performed, whether the thermoset remains intact or is completely degraded. Suitable compounds for cleaving the bonds include, but are not limited to, tetrabutylammonium fluoride, stannous fluoride, potassium fluoride, sodium fluoride, a Lewis acid, a Lewis base, a Bronsted acid, or a Bronsted base.

The following examples are given to illustrate specific applications. These specific examples are not intended to limit the scope of the disclosure in this application.

Example 1

Synthesis of 2,2'-(dimethylsilanediyl)bis(ethan-1-ol)

A solution of dimethyldivinylsilane (1.0 g, 8.91 mmol, Sigma-Aldrich) in 10 mL dry tetrahydrofuran (THF) was added dropwise to a 0.5 M solution of 9-borabicylco[3.3.1]nonane (9-BBN) in THE (17.82 mmol, 36 mL, Sigma-Aldrich) and the resulting mixture was stirred at room temperature for 4 hours. This was followed by the addition of water (10 mL) and 3M aqueous sodium hydroxide solution (10 mL). Subsequently, aqueous hydrogen peroxide solution (30%, 10 mL) was added dropwise at 0° C. within 15 minutes and the reaction mixture was heated to reflux for 3 hours. Upon cooling to 20° C., the aqueous layer was saturated with potassium carbonate and the organic layer was removed. The aqueous layer was then extracted with ethyl acetate (3×20 mL). The combined organic phases were dried over anhydrous magnesium sulfate, filtered, and concentrated to dryness. The crude product was dissolved in dichloromethane (60 mL) and stored at 4° C. for overnight. The precipitate was filtered and the filtrate and washing were evaporated to dryness. The residue was purified via column chromatography using a 9:1 ethyl acetate to hexane mixture to afford the product as a clear liquid (1.1 g) in 83 percent yield. The molecular weight (MW) was 148.28.

Example 2

Synthesis of a Silyl-Containing Polyurethane Thermoset—

Figure 8:
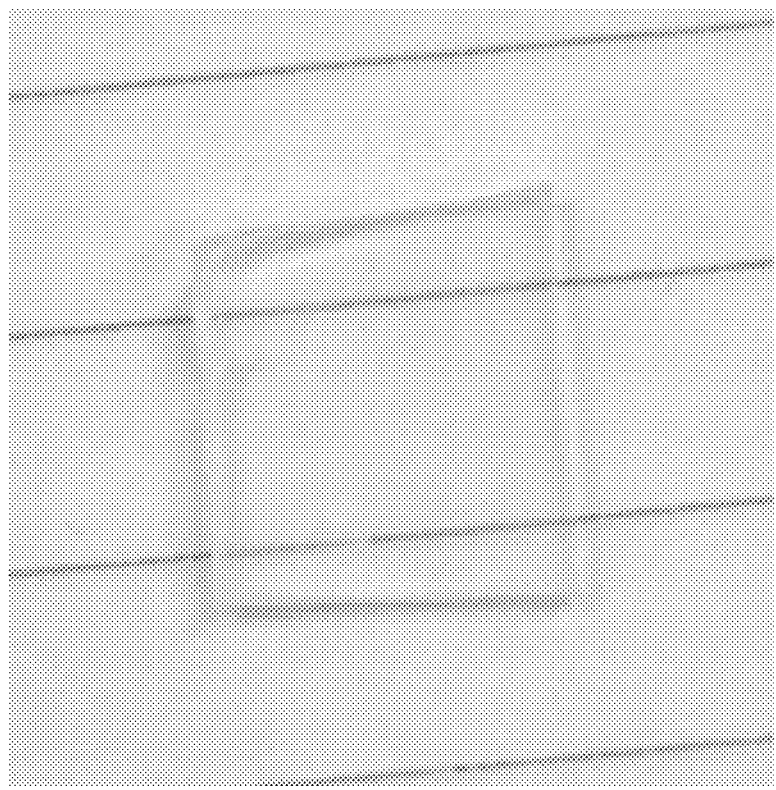
FIG. 8 shows a clear silyl-containing polyurethane thermoset.

A thermoset with a 1:1.2 equivalent ratio of hydroxyl (OH) to isocyanate (NCO) groups was made by dissolving 0.74 g (0.010 equivalents of OH) of 2,2'-(dimethylsilanediyl)bis(ethan-1-ol) (from Example 1) and 2.31 g (0.012 equivalents of NCO) of a trifunctional aliphatic isocyanate based on hexamethylene diisocyanate, Desmodur N 3300A (Covestro), in tetrahydrofuran (TF) at room temperature using a round bottom flask. The flask was heated and stirred in an oil bath at 50° C. for 1 hour, then poured into an aluminum weigh boat and cured in a 60° C. oven overnight. A catalyst was not added. The thermoset was clear, as seen in FIG. 8. The thermoset gel fraction was 0.92, and the material had a glass transition temperature ($T_g$) of 68.1° C.

Example 3

Disassembly of a Silyl-Containing Polyurethane Thermoset—

The thermoset in Example 2 was placed in a vial and a 0.5 M solution of tetrabutylammonium fluoride (TBAF) in TH (Sigma-Aldrich) was added. The thermoset remained static (no stirring) for a period of 1 week, then removed and dried in a vacuum oven. After 1 week, the glass transition temperature ($T_g$) of the thermoset had decreased to 35.3° C., and the thermoset was soft and rubbery.

Example 4 (Comparative)

Non-Silyl-Containing Polyurethane Thermoset—

A 1:1.2 equivalent ratio of hydroxyl (OH) to isocyanate (NCO) groups was made by dissolving 1.04 g (0.020 equivalents of OH) of 1,5-pentane-diol (available from Sigma-Aldrich) and 4.62 g (0.024 equivalents of NCO) of a trifunctional aliphatic isocyanate based on hexamethylene diisocyanate, Desmodur N 3300A (Covestro), in tetrahydrofuran (THF) at room temperature using a round bottom flask. The flask was then heated and stirred in an oil bath at 50° C. for 1 hour, then poured into an aluminum weigh boat and cured in a 60° C. oven overnight. A catalyst was not added. The thermoset was clear with a gel fraction of 0.97, and the material had glass transition temperature ($T_g$) of 40.7° C. The thermoset was then placed in a vial and a 0.5 M solution of tetrabutylammonium fluoride (TBAF) in THE was added. The thermoset remained static (no stirring) for a period of 1 week, then removed and dried in a vacuum oven. After 1 week, the glass transition temperature ($T_g$) remained at 40.8° C., showing that the thermoset was unable to disassemble without the silyl triggers.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:
1. A method comprising:
   providing a thermoset made by a process comprising:
      providing a polyfunctional compound selected from polyisocyanate, polyacrylate, and polyepoxy; and
      reacting the polyfunctional compound with a hydroxyl- or amine-terminated silyl-containing compound;
      wherein the polyfunctional compound and the silyl-containing compound are at least difunctional; and
   reacting the thermoset with a fluoride salt, an acid, or a base to cleave the silicon-carbon bonds in the thermoset.

2. The method of claim 1, wherein the polyfunctional compound is a polyisocyanate.

3. The method of claim 2, wherein the polyisocyanate is aliphatic, aromatic, cycloaliphatic, an isocyanate homopolymer, or an isocyanate-functional pre-polymer.

4. The method of claim 2, wherein the polyisocyanate is an aliphatic trimer based on hexamethylene diisocyanate.

5. The method of claim 1, wherein the polyfunctional compound is an epoxy-functional dimethylpolysiloxane, an epoxy-functional polydimethyldiphenylsiloxane, an aliphatic epoxy, an aromatic epoxy, a cycloaliphatic epoxy, an acrylate-functional dimethylpolysiloxane, or 1,6-hexane-dioldiacrylate.

6. The method of claim 1, wherein the silyl-containing compound has the formula

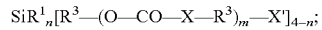

wherein each X is independently selected from —O— and —NR$^2$—;
wherein each X' is independently selected from —OH and —NHR$^2$;

wherein each $R^1$ is independently selected from alkyl groups and aryl groups;

wherein each $R^2$ is independently selected from —H, alkyl groups, and aryl groups;

wherein each $R^3$ is an independently selected alkylene group;

wherein n is 0, 1, or 2; and wherein each m is an independently selected non-negative integer.

7. The method of claim 6, wherein the silyl-containing compound has the formula $$SiR^1{}_n[(CH_2)_2OH]_{4-n}.$$

8. The method of claim 6, wherein the silyl-containing compound is $Si(CH_3)_2(CH_2CH_2OH)_2, Si(Ph)_2(CH_2CH_2OH)_2, SiPh(CH_2CH_2OH)_3, Si(CH_2CH_2OH)_4, Si(Ph)_2(CH_2CH_2OCON(CH_3)CH_2CH_2OH)_2.$ 9. The method of claim 6, wherein each $R^3$ group is ethylene, propylene, or butylene.

10. The method of claim 1, wherein the polyfunctional compound is reacted with a hydroxyl-functional or amine-functional material with at least one hydroxyl or amine group.

11. The method of claim 1, wherein the thermoset comprises at least 5 wt. % of the silyl-containing compound.

12. The method of claim 1, wherein the reaction is performed with a catalyst, a solvent, a pigment, or an additive.

13. The method of claim 1, wherein the fluoride salt is tetrabutylammonium fluoride, stannous fluoride, potassium fluoride, or sodium fluoride.

14. The method of claim 13, wherein the acid is a Lewis acid or Bronsted acid.

15. The method of claim 13, wherein the base is a Lewis base or Bronsted base.

* * * * *